350-3.75
SR
XR 3,868,658
~~T6~
X 3057 N

United Stat
Kiemle

[11] 3,868,658
[45] Feb. 25, 1975

[54] DEVICE FOR OPTICAL SUPERHETERODYNE INFORMATION READING

[75] Inventor: Horst Kiemle, Munich, Germany

[73] Assignee: Siemens Aktiengesellshaft, Berlin and Munich, Germany

[22] Filed: Sept. 20, 1972

[21] Appl. No.: 290,501

[30] Foreign Application Priority Data

Sept. 27, 1971 Germany ............................ 2148173

[52] U.S. Cl.340/173 LT, 340/173 LS, 340/173 LM, 350/3.5

[51] Int. Cl. ......................... G11c 13.02, G02b 27/00

[58] Field of Search. 340/173 LT, 173 LS, 173 LM, 340/173 CC; 350/3.5

[56] References Cited

UNITED STATES PATENTS

| | | | |
|---|---|---|---|
| 2,896,086 | 7/1959 | Wunderman | 340/173 LT |
| 3,432,675 | 3/1969 | Roby | 340/173 LM |
| 3,651,498 | 3/1972 | Magill et al. | 340/173 LM |
| 3,698,010 | 10/1972 | Lee | 340/173 LM |
| 3,767,285 | 10/1973 | Mezrich | 340/173 LT |

OTHER PUBLICATIONS

Johnson, Optical Mark Sensing, IBM Technical Disclosure Bulletin, Vol. 3, No. 4, 9/60, p. 28.

*Primary Examiner*—Stuart N. Hecker
*Attorney, Agent, or Firm*—Hill, Gross, Simpson, Van Santen, Steadman, Chiara & Simpson

[57] ABSTRACT

A device for reading information optically characterized by a beam of light from a source being passed through a beam splitter to provide two partial beams. One beam is projected onto an optical memory to have information imposed thereon and then is directed onto a detector. The other partial beam is guided through a frequency shifting device and a beam deflecting device, which devices may be either a single unit or two separate units, and the beam is then projected on the detector which has a nature to receive both the first and second partial beams with a superheterodyne reception to produce an electrical signal which is received by an intermediate frequency amplifier. In one embodiment of the invention, the surface of the detector is a continuous single detecting surface with a single pair of output connections. In another embodiment, the detecting surface is a plurality of parallel extending strips with each strip having a separate pair of output connections and the device includes an electronic switch for selectively connecting a pair of output connections to the amplifier. A third embodiment utilizes a segmented matrix of a plurality of elements arranged in rows and columns with all the elements in each column connected in parallel to a single pair of output connections respectively and includes an electronic switch for selectively interconnecting the output connections of a selected column to the amplifier.

7 Claims, 5 Drawing Figures

3868658

DEVICE FOR OPTICAL SUPERHETERODYNE INFORMATION READING

BACKGROUND OF THE INVENTION

1. Field of the Invention

The present invention relates to a device for reading information optically utilizing a light source producing a light beam, a memory containing the information to be read which imposes the information on the light beam and a detector for converting the information contained in the light beam into electrical signals.

2. Prior Art

In the following, the term memory is supposed to be understood in the broadest sense. It usually refers to an arrangement emitting information which is in the form of a coherent light distribution and which information has been produced or stored in any possible way.

When the information is emitted which had been prepared in an optical arrangement or device, a conversion of the light pattern into electronic signals usually has to be carried out. Examples of this conversion are prior arrangement for holographic sign recognition, date storage and special television camera. To convert the light patterns into electronic signals in the above examples, a photodiode matrix was utilized as a detecting device or detector and preferably was a semiconductor photodiode matrix made by an integrated technique. However, each individual diode of the matrix requires decoupling from the other diodes and a high number of switch elements were required in the matrix construction to accomplish this decoupling. The technique for the production of such a matrix of semiconductor diodes incolves many technological problems. Furthermore detectors using a semiconductor diode matrix are almost exclusively limited to detecting light which is in the visual range of the spectrum and a square rectification of the detector did not always have the necessary sensitivity.

SUMMARY OF THE INVENTION

The present invention is directed to a device or arrangement for reading information optically which device does not require a decoupling circuit, has an improved sensitivity and enables the production of the detecting device with a simplified integrated circuit technology. The device utilizes a light source producing a beam of light which is projected onto a portion of an optical memory which imposes information on the beam and a detector for converting the information, which was imposed on the beam of light, into electrical signals with the improvement being a beam splitter disposed in the path of the light beam between the source and the optical memory to separate a partial beam from the beam of light prior to entry into the optical memory, means for shifting the frequency of the partial beam of light, means guiding the partial beam of light to by-pass the optical memory and onto the detector which means includes means for deflecting the light onto different portions of the detector, said detector having a superheterodyne reception of the partial beam and the beam having the information imposed thereon to produce an electrical signal and an intermediate frequency amplifier arranged to receive the electrical signals emitted by the detector. In one embodiment of the invention, the means for shifting is a separate unit providing a constant value for the change in frequency of the partial beam. In another embodiment of the invention, the means for deflecting includes means for shifting the frequency and the frequency shifting is variable and occurs during the deflection of the beam which shifting is a deflection or direction dependent frequency shifting. If the frequency shifting is variable, as in the second embodiment, a controllable modulator may be provided to change the frequency of the partial beam dependent on the beam deflection to create a constant frequency shift value for the beam projected onto the detector or an electronic oscillator whose frequency changes are synchronized with the deflecting means is used to provide a signal that is mixed with the signals from the detector to provide a constant intermediate frequency signal for the amplifier. The detector may be a continuous detecting surface with a single pair of connecting leads extending to the amplifier or it may be a segmented matrix of individual detector elements arranged in rows and columns with the elements of each column connected in parallel to a pair of output connections. In another embodiment of the detector, the detector surface comprises a plurality of elongated detector strips with each strip connected to a separate pair of output connections. The means for deflecting may deflect the partial beam to have a substantially circular cross-section when projected on the detecting surface and is shifted on the surface in both the horizontal and the vertical directions or the means for deflecting may produce a fan-shaped beam with an elongated cross-section with the major axis extending substantially perpendicular to the elongated strip or the columns of elements and the deflecting means shifts the beam in a direction parallel to the direction at which the columns or strips extend. In the embodiments having the elements arranged in columns of interconnected elements or strip-like detecting surfaces, an electronic switch may be utilized to selectively connect separate pairs of output connections to the amplifier or an amplifier may be connected to each pairs of outlet connections to enable a reading in a parallel manner.

DESCRIPTION OF THE PREFERRED EMBODIMENT

Figure 1:
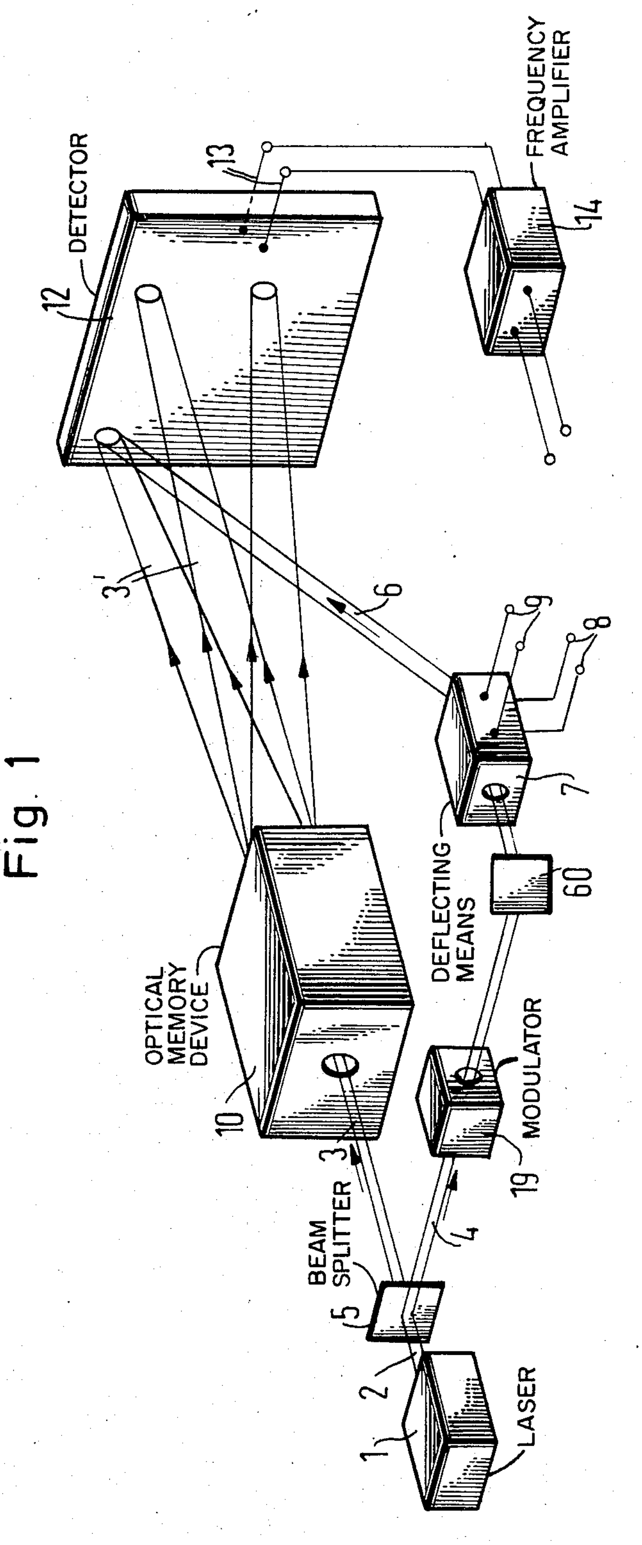
FIG. 1 is a schematic arrangement for an optical reading of information according to the present invention.

The principles of the present invention are particularly useful in an arrangement or device for reading information optically which is illustrated in FIG. 1. The device has a source of light such as a laser 1 to produce a beam 2. In the path of the beam 2, a beam splitter 5 such as a partially transparent mirror divides the beam into a pair of partial beams 3 and 4 with the partial beam 3 being projected into a device 10 which contains the optical memory and any necessary equipment for positioning the memory or a portion thereof in the path of the beam. The memory imposes information on the beam 3 to produce an object beam or beams 3' which are projected onto a surface of a detector 12. One example of a memory is a hologram which reconstructs object waves or beams 3' when the beam 3 is projected thereon.

The other partial beam 4 is separated by the beam splitter and directed through means for shifting the frequency and then to means for guiding the beam onto the detector 12 with the beam by-passing the device 10. The means for guiding includes a mirror 60 and a means 7 for deflecting the beam as it is projected on the surface of the detector 12. As illustrated the means 7 is an electrically controllable light deflector having electrodes 8 and 9 for applying a deflecting voltage to cause the scanning of the partial beam, indicated as 6, in both a horizontal and vertical direction on the surface of detector 12. As illustrated the partial beam 6 has a circular cross-section.

In the embodiment of FIG. 1, the means for shifting the frequency of the beam 4 is illustrated as a modulator 19 which acts on the beam 4 prior to its being deflected by the beam light deflector 7. The modulator 19 produces a constant value of change or shifting of the frequency in the partial beam 4.

When the object beam 3' and the deflected partial beam 6 coincide on the surface of the detector 12, a superheterodyne reception occurs and an electrical signal of an intermediate frequency is produced by the detector. This signal is guided through a pair of output connections 13 of the detector 12 to selective intermediate frequency amplifier 14 which produces the output impulse. Thus, the super-heterodyne reception enables the producing of an electrical signal of a desired frequency range for light beams having a different frequency range.

In an embodiment of the invention, instead of using a deflector which relies on the application of voltages to cause the deflection of the beam, an acousto-optical deflector may be utilized. Such a deflector creates a frequency shift in the beam as it is being deflected and thus the means for deflecting and the means for shifting the frequency is accomplished in the same unit. The amount of the change or shifting in the light frequency that occurs in an acousto-optical deflection is dependent on the direction of the deflection so that the frequency shifting is a deflection or direction dependent frequency shifting and is a variable shifting. In order to bring this direction dependent frequency shifting to a constant value and to be able to make a correction for possible frequency shifting occurring in the object beam, the modulator 19 is still provided. This modulator 19 is a controllable modulator which varies the modulation to compensate for the different amounts of frequency shifting occurring in the acousto-optical deflector.

Another possibility of compensating for the direction dependent frequency shifting which occurs in the acousto-optical deflector is to remove the modulator 19 so that the detector 12 emits an intermediate frequency signal which has a variable This this signal is then mixed with a signal from an electronic oscillator 20 whose frequency is switched or shifted synchronously with the light deflector 7 to produce a mixed intermediate frequency signal of a constant frequency which is received by the amplifier 14.

The detector 12 for the conversion of a coherent light distribution into electric signals comprises a light sensitive surface which emitts an electric current or a voltage when light is imposed thereon. Semiconductor photodiodes or vidicon layers are examples of such a light sensitive surface. In the embodiment illustrated in FIG. 1 the detecting surface of the detector 12 is a continuous single surface and has a single pair of output connections 13.

Figures 2, 3, 4:
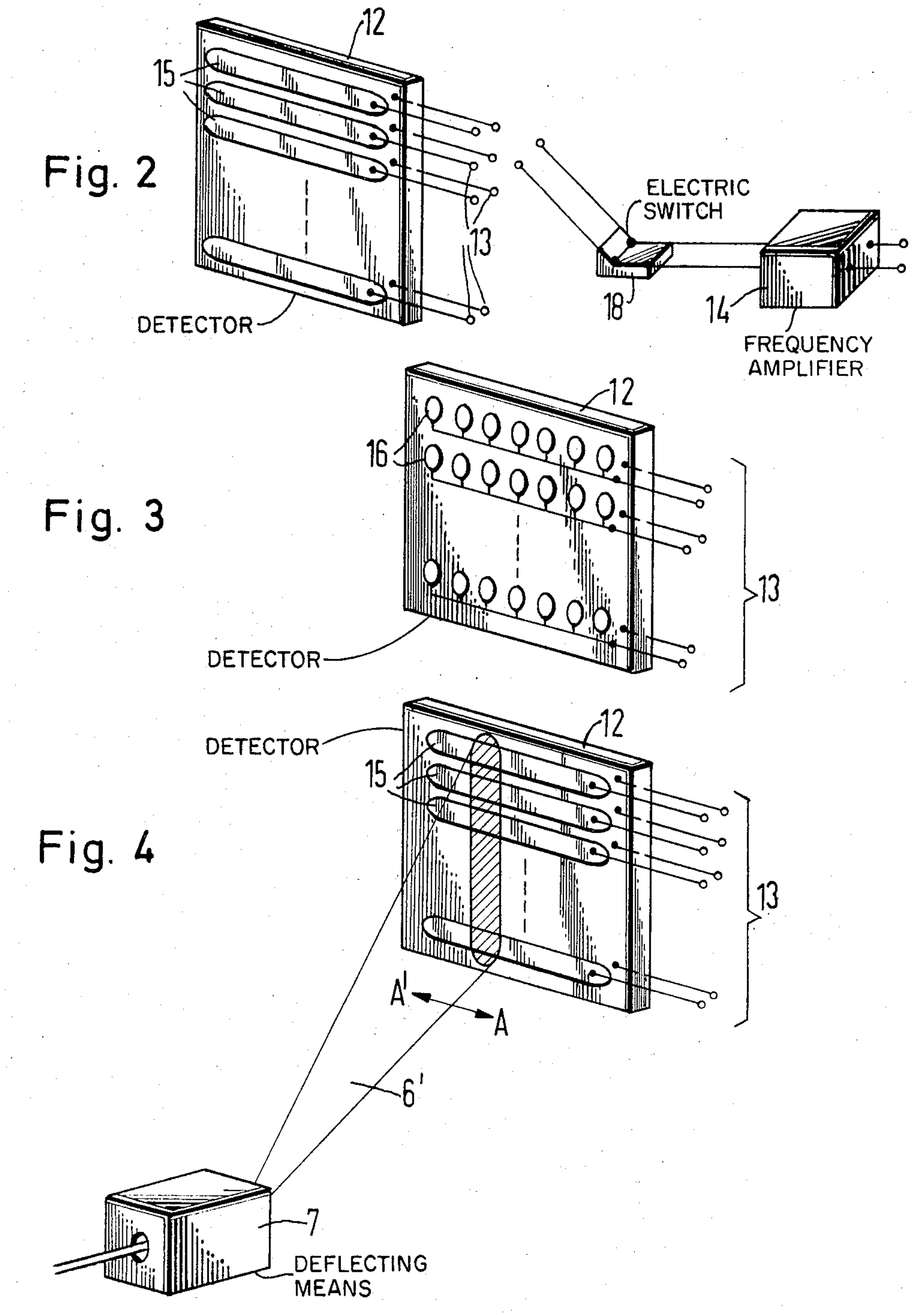
FIG. 2 is an illustration of the first preferred embodiment of the detector.
FIG. 3 is a second preferred embodiment of the detector.
FIG. 4 is a light distribution of a partial beam on a detector of FIG. 2.
Figure 5:
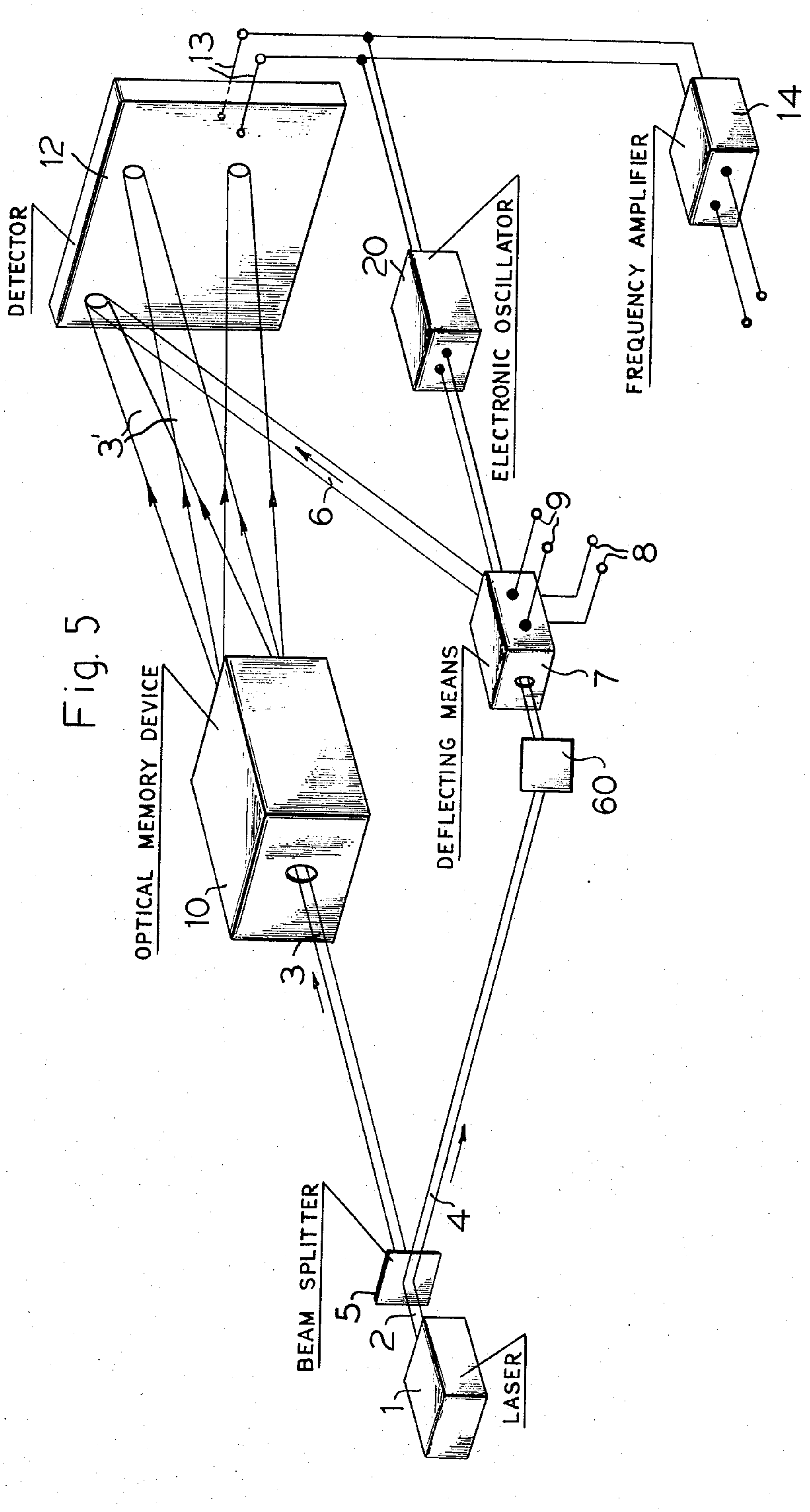
FIG. 5 is a schematic presentation of an embodiment of an optical reading of information according to the present invention.

The first preferred embodiments of the detector 12 is illustrated in FIGS. 2 and 4. In this embodiment a light sensitive surface of the detector 12 is subdivided into strip-shaped segments 15. Each segment 15 is provided with a pair of outlet connections 13 which can be applied to an intermediate frequency amplifier 14 in a times sequence or succession by an electronic switch 18.

Another embodiment of the detector 12 is illustrated in FIG. 3 and has a light sensitive surface which is a segmented matrix comprising a plurality of elements 16 which are arranged in columns and rows. Each of the elements 16 in a single column are connected in parallel to the same pair of output connections to produce parallel lines of interconnected elements. Instead of interconnecting the columns of elements, the elements in each row can be interconnected. The beam 6 can have a substantially circular cross-section and be shifted by deflector 7 in two directions, one being parallel to the columns the second being parallel to the rows so that the two directions are perpendicular to each other and provides the desired scanning of all elements sequentially.

As illustrated in FIG. 4, the deflecting unit 7 produces a fan-shaped beam 6' which has an elongated or fan-shaped cross-section with the direction of the extension of the fan-shaped beam or the major axis of the elongated cross-section extending substantially perpendicular to the direction of the segments 15. The deflecting units 7 are provided with means to shift the beam 6' along the direction indicated by the double arrow AA' which is substantially parallel to the length of the strips 15 and perpendicular to the major axis of the fan-shape of the beam 6'. With such a fan-shaped partial beam 6', the information detected on the strips 15 can be emitted in parallel and in such an instance each pair of output connections 13 require the necessary amplifier. The beam 6' is also useful with the embodiment of FIG. 3 with the parallel connected elements 16 and is arranged with the major axis or the direction of the fan-shape extension being substantially perpendicular to the direction of the columns. The shifting of the beam 6' is then in a direction substantially parallel to the direction of the columns. The elements 16 can also be read parallel if desired. The embodiments of the detector 12, illustrated in FIGS. 2 and 3, eliminate a large number of the switching elements and thus reduce the technological problems that occur in the production of the detector matrix. Thus each detector can be made by an integrated circuit technique.

In order to achieve the switching state of any of the detector surfaces or parts, the object beam 3' along or the partial beam 6 alone or both beams may be amplitude modulated to achieve the threshold value of the switching state. In such an instance, an amplitude modulator is supplied in the beam path in a desired position and an amplifing device such as 14 at the output will contain additional demodulation and recognition devices for the applied amplitude modulation.

Although various modifications might be suggested by those versed in the art, it should be understood that I wish to employ within the scope of the patent granted hereon, all such modifications as reasonably, and properly come within the scope of my contribution to the art.

I claim:

1. In a device for optically reading information having a light source for directing a beam of light onto a portion of an optical memory which memory imposes information on the beam, a beam splitter disposed in the path of light between the source and the optical memory to separate a partial beam from the beam of light prior to striking the optical memory, means for guiding the partial beam of light through a frequency shifter and onto a detector which has a heterodyne reception of the partial beam and the beam having the information imposed thereon to transform light beams into electrical signals which are received by an intermediate frequency amplifier, the improvement comprising the frequency shifter being an acousto-optical light deflector which causes a direction-dependent frequency shifting of the partial beam which causes the electrical signal of the detector to be a variable intermediate frequency signal and an electronic oscillator providing a variable frequency output which is mixed with the variable intermediate frequency signal of the detector prior to the signal being received by the intermediate frequency amplifier, said oscillator being synchronized with the acousto-optical light deflector so that the signal received by the amplifier is a constant frequency signal.

2. In a device according to claim 1, wherein the detector is a segmented matrix of individual detector elements arranged in rows and columns and the elements of each column are connected in parallel to a separate pair of output connections, wherein the partial beam on the detector surface has a cross section of a symmetrical circle, and wherein the acousto-optical deflector shifts the beam on the detector surface in two directions with one direction being parallel to the rows and the other direction being parallel to the columns.

3. In a device according to claim 2, which includes an electronic switch for selectively interconnecting a selected pair of output connections to the intermediate frequency amplifier and said electronic switch being operated in time succession and synchronously with the deflection of the partial beam.

4. In a device according to claim 1 wherein the detector is a segmented matrix of individual detector elements arranged in rows and columns and the elements of each column are connected in parallel to a separate pair of output connections, wherein the partial beam directed on the detector surface by the acousto-optical light detector has a fan-shaped cross section with the direction of expansion of the beam extending perpendicular to the direction of the columns, and wherein the acousto-optical light deflector shifts the fan-shaped beam along a direction extending parallel to the columns of interconnected elements.

5. In a device according to claim 4 which includes an electronic switch for selectively interconnecting the intermediate frequency amplifier to a selected pair of output connections and said electronic switch being operated in time succession and synchronously with the deflection of the partial beam by the acousto-optical light deflector.

6. In a device according to claim 1 wherein the detector surfaces comprises a plurality of elongated strips with each strip connected to a separate pair of output connections, wherein the partial beam directed on the detector surface has a fan-shaped cross section with the direction of the fan-shape extending perpendicular to the direction of the strip, and the acousto-optical light deflector deflects the fan-shaped partial beam in a direction extending parallel to the strips.

7. In a device according to claim 6 which includes an electronic switch connected to the intermediate amplifier for interconnecting the amplifier to a selected pair of output connections, said electronic switch operating in time succession and synchronously with the acousto-optical light deflector.

* * * * *